United States Patent
Ayyagari

(10) Patent No.: US 7,443,833 B2
(45) Date of Patent: Oct. 28, 2008

(54) AD HOC NETWORK TOPOLOGY DISCOVERY

(75) Inventor: Deepak V. Ayyagari, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 421 days.

(21) Appl. No.: 10/913,751

(22) Filed: Aug. 6, 2004

(65) Prior Publication Data

US 2006/0029007 A1 Feb. 9, 2006

(51) Int. Cl.
H04L 12/28 (2006.01)

(52) U.S. Cl. .................. 370/351; 370/310; 370/329; 370/343; 370/254

(58) Field of Classification Search ............... 370/310, 370/329, 343, 254, 352; 455/310, 329, 343
See application file for complete search history.

(56) References Cited

U.S. PATENT DOCUMENTS

| | | | | |
|---|---|---|---|---|
| 5,661,727 A | * | 8/1997 | Kermani et al. | 370/445 |
| 5,682,479 A | * | 10/1997 | Newhall et al. | 709/242 |
| 5,978,363 A | * | 11/1999 | Dimitrijevic et al. | 370/319 |
| 6,483,812 B1 | | 11/2002 | Prorock | |
| 6,865,609 B1 | * | 3/2005 | Gubbi et al. | 709/230 |
| 2001/0029166 A1 | | 10/2001 | Rune et al. | |
| 2002/0044533 A1 | | 4/2002 | Bahl et al. | |

FOREIGN PATENT DOCUMENTS

EP 1 107 522 A1 6/2001
WO WO 02/087172 A1 10/2002

* cited by examiner

Primary Examiner—Nay Maung
Assistant Examiner—Richard Chan
(74) Attorney, Agent, or Firm—David C. Ripma; Jon M. Dickinson; Robert D. Varitz

(57) ABSTRACT

Disclosed herein is a method for performing ongoing ad hoc network topology discovery with regard to a collection of plural participating nodes. The method features the steps of (a) defining an appropriate topology-discovery condition to be associated with such nodes, (b) when that condition occurs, establishing and activating a dedicated, contention-free, discovery-communication time period wherein each node broadcasts, for reception by all other nodes, its attributes, including its identity, it operating characteristics, its capabilities, and its associated link qualities in relation to the other nodes, (c) utilizing the results of such establishing and activating steps, creating an overall network topology map associated with the nodes, and (d) then making that map available for use in subsequent network organizational activities, including the practices of creating suitable communication links between nodes, and enabling organization of a network into appropriate subnets and proxy networks.

10 Claims, 3 Drawing Sheets

| DISCOVERY MSG |
|---|
| Source MAC Address/TEI (6 bytes) |
| Device Class (1 byte) |
| Activity Indicator (Optional) (1 byte) |
| Number of Contention Intervals (CI) (1 byte) |
| Frame Number of CI -1 (1 byte) |
| Slot Number of CI-1 (1 byte) |
| • • • |
| Frame Number of CI-N (1 bytes) |
| Slot Number of CI-N (1byte) |

Fig. 4

| Topology Table for Node A | | | | | |
|---|---|---|---|---|---|
| NODES (Device Class optional) | DISCOVERED NODE LISTS -> | | | | |
| A | A | B | C | | |
| B | A | B | C (X) | | |
| C | A | B | C | D | E |
| | | | | | |
| Topology Table for Node D | | | | | |
| NODES | DISCOVERED NODE LISTS -> | | | | |
| C | A | B | C | D | E |
| D | | | C | D | E |
| E | | | C | D | E |
| | | | | | |

Fig. 5

AD HOC NETWORK TOPOLOGY DISCOVERY

BACKGROUND AND SUMMARY OF THE INVENTION

This invention pertains to a unique communication-network topology discovery practice which is implementable as a step in a dynamic overall process leading to self-organization of a collection of nodes into an ad hoc network. The invention is useful in organizing both distributed and centralized communication-networks. While the overall practice of ad hoc network organization involves a number of other steps and stages, the present invention focuses only on a topology discovery sub-practice within that overall practice.

Useful and related background information, which is hereby incorporated by reference into this disclosure, is found in prior-filed, co-pending U.S. Regular Patent Applications filed by me on Feb. 9, 2004 including (a) Ser. No. 10/775,717 for "Centralized Network Organization and Topology Discovery in Ad-Hoc network with Central Controller" and, (b) Ser. No. 10/775,967 for "Distributed Network Organization and Topology Discovery in Ad-Hoc Network".

Fundamentally, and generally speaking, topology discovery involves a practice wherein all nodes which are to be assembled into a network, or are about to be linked in an otherwise pre-existing network, learn of each other's presences, and about each other's operating and linking characteristics and capabilities. More specifically, topology discovery pertains to knowledge regarding, among other things as will become apparent, (a) the identities of all nodes in a network, (b) the states of existing/possible connectivity between these nodes, (c) the identity of ultimately an eventually selected CCo (Central Coordinator Node), (d) the identities of so-called hidden nodes (defined below), and (e) the identities of what are referred to herein (later explained) as proxy nodes.

In a self-organizing ad hoc communication network, nodes need to learn about the presences of other nodes in the network, and about the availabilities of acceptable bi-directional links between any two nodes. The nodes must also be able to organize themselves into a network controlled ultimately by a suitable, selected CCo. Ultimately, and in accordance with practice of the present invention, in a resulting, completely organized network, every node will know the state of links existing between all nodes in the network. In other words, all nodes will have and maintain knowledge about the global state of connectivity in the network, including specific information relating to relevant individual characteristics of each node.

The topology discovery process of this invention, implemented via a discover beacon, is employed under different defined, or definable, dynamic and changing conditions, such as (a) during initial network organization, (b) in a situation wherein a node joins or leaves the network, (c) during recovery from network or node failure, (d) upon the occurrence of any event that changes the topology of a network, such as a circumstance wherein the CCo shuts down, or a better suited CCo becomes available in a network, and (e) other changing network conditions. The discover beacon indicates to listening nodes periods of time within a frame when they may transmit any messages required to join/associate with the network, thus to be discovered. Additionally, the discover beacon echoes frame-schedule information contained within a master beacon transmitted by a network controller, if such a controller should then exist, and if such a controller does not then exist, involves a time-frame schedule which is consistent with schedules broadcast by other nodes.

It is important to understand that "topology discovery", as proposed by the present invention, and as used as a term herein, is a dynamic practice. It is defined to include, among other things, the ongoing background collection and assessment of internodal link-capabilities information, and appropriate list updating, derived from network transmissions, and obtained and made useable at a level enabling a CCo always to be poised to organize (and re-organize) the associated network into appropriate groupings—i.e., sub-nets and proxy networks. Such organizational behavior includes, of course, the positive "creation" of appropriate links between nodes, based upon matters including an understanding of existing and possible connectivities, and most certainly upon identified node operating capabilities. In other words, "topology discovery" is not constrained simply to the matters of communication routing between nodes.

It additionally involves the important individual nodal behavior of listening to topology discovery messages so as to obtain ongoing guidance regarding various network access opportunities.

Topology discovery, as proposed by the present invention, is described herein in two different general network configurations, referred to, on the one hand, as centralized and on the other, as distributed. As will be seen shortly, in a centralized network, the CCo, which acquires such a role in a manner shortly to be described, following the practice of topology discovery, itself creates what is referred to herein as a topology map, or table, of the associated network. In a distributed network, it is the individual participating nodes which, operating collectively after completion of the process of topology discovery, create and each hold a network topology map. From this established map, however arrived at, full network organization takes place, such activity being beyond the scope of the present invention.

Before describing the topology discovery practice of the invention, two language terms which are employed herein should be explained. These terms are "hidden node", or HN, and "proxy node", or PN (or PCo). A hidden node is one which cannot communicate directly with a network CCo. A proxy node is one which acts as a CCo surrogate to provide a communication path between the network CCo and a hidden node.

In further general terms, the topology-discovery method of this invention can be described as including the steps of: (a) defining an appropriate topology-discovery condition which may be associated with plural nodes that are to be organized into a network; (b) on the occurrence of the existence of such a condition, establishing and activating a discovery-communication time period which is dedicated to allowing each of the plural nodes to broadcast, for reception by all of the other nodes, its attributes, including its identity, it operating characteristics, its capabilities, and its associated link qualities in relation to the other nodes, whereby ultimately every one of the plural nodes becomes aware of these attributes of all of the other nodes; (c) utilizing the results of the establishing and activating steps, creating a topology map associated with the nodes, and (d) then making the created topology map available for use in a process involving subsequent organization of the nodes into a network.

As will be seen, the created topology map, among other things, contains a network connectivity map, and additionally, may be employed to enable information packet routing.

The various features and advantages that are offered by the present invention will become more fully apparent as the description which now follows is read in conjunction with the accompanying drawings.

DESCRIPTION OF THE DRAWINGS

FIG. 4 shows a non-limiting, representative format of a discovery message which may be used in the practice of the invention.

FIG. 5 pictures a representative portion of an organized network topology table (map) that has resulted from practice of the invention. This table portion is specifically related to the network arrangement shown in FIG. 1.

DETAILED DESCRIPTION OF THE INVENTION

Figure 1:
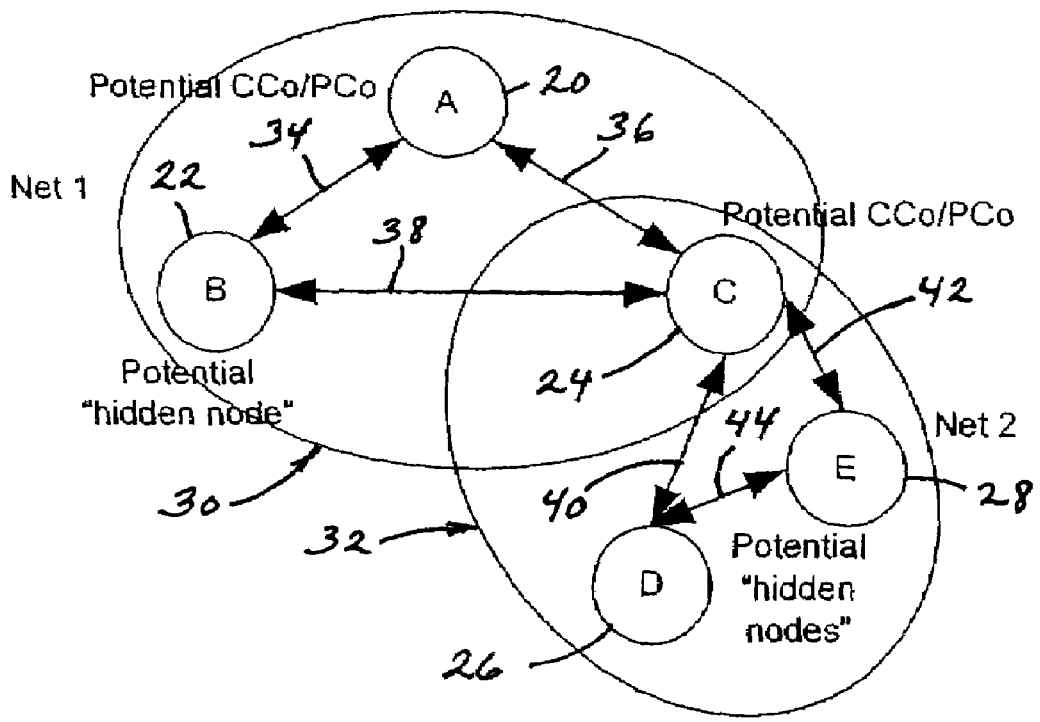
FIG. 1 illustrates, in block/schematic form, a network environment suitable for practice of the present invention.

Turning attention now to the drawings, and beginning with FIG. 1, here five nodes 20, 22, 24, 26, 28, also referred to, respectively, by the letters A, B, C, D, E, are shown organized, for illustration purposes, into two possible networks, or network topologies, 30, 32. Topologies 30, 32 are also referred to herein, respectively, as Net 1 and Net 2. Viable interconnections which relate to these two illustrative organizations are shown at 34 (between A, B), 36 (between A, C), 38 (between B, C), 40 (between C, D), 42 (between C, E), and 44 (between D, E).

Looking at these two topologies, or configurations, and recognizing initially that any of the nodes could be the CCo, Net 1 (30) has node A as the CCo, has nodes B and C as hosts within the network, and has node C as a PCo for the hidden nodes D and E. Net 2 (32) has node C as the CCo, nodes D and E as hosts within the network, and node C as a PCo for hidden nodes A and B. A network with only nodes A, B and C as host nodes, and with node A as the CCo, would leave nodes D and E unconnected. Network performance will be significantly different in the two configurations based, among several other factors, on the traffic load handled by nodes chosen as CCos, by the overhead of having a node function as a PCo (separate from a CCo), and if the qualities (capacities) of links between the CCo and the other nodes vary. In Net 2, node C can act both as the CCo and the PCo, and can directly communicate with all four other nodes. In Net 1, node A as the CCo can only communicate directly with two other nodes (B and C), and needs a proxy to handle nodes D and E. As will become apparent, the finally selected CCo and PCo nodes, and the identities of the hidden nodes, are determined from the discovery information developed during the topology discover process of the present invention.

It is now with reference to the node arrangement pictured in FIG. 1 that the topology discovery practice of the present invention is described.

Figure 3:
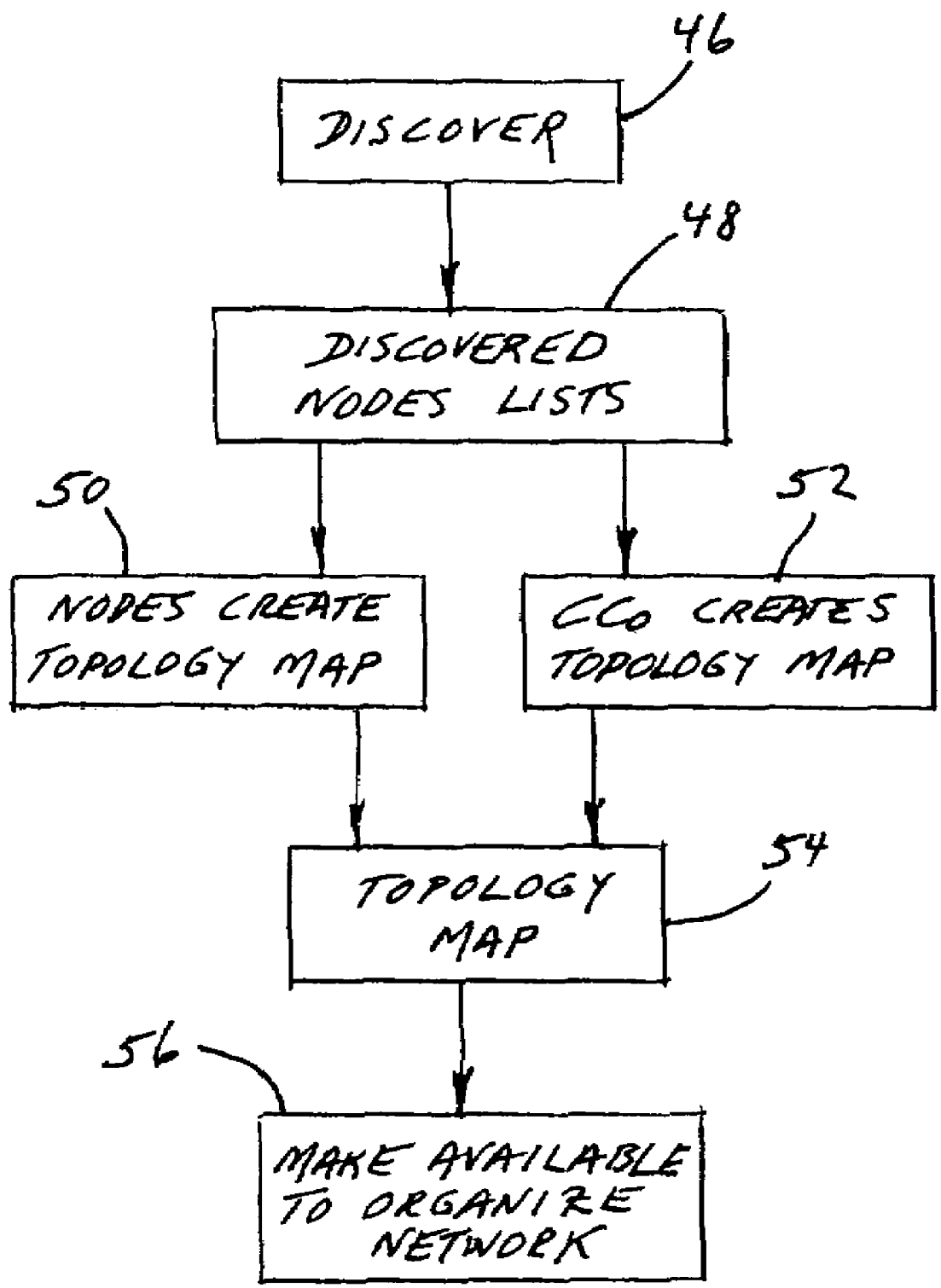
FIG. 3 is a block/schematic flow diagram which describes the practice of the present invention both in relation to a distributed-type network (the central and left-side portions of this figure), and in relation to a centralized-type network (the central and right-side portions of this figure).

The basic operational flow of topology discovery, carried out in accordance with the preferred manner of practicing the invention, is illustrated in FIG. 3, wherein six appropriately word-labeled blocks 46, 48, 50, 52, 54, 56 are shown. Practice of the invention in the organization of a distributed network takes place with a sequential flow of activity occurring in the order of blocks 46, 48, 50, 54, 56. In the organization of a centralized network, flow takes place in the sequential order of blocks 46, 48, 52, 54, 56.

In distributed network organization, with reference to the practice of topology discovery in accordance with the present invention, an assumption is made that there is, initially, no CCo. Accordingly, the below-described topology discovery activities which take place up to and including the creation of a network topology map are carried out collectively by all of the individual participating nodes. These nodes collectively end up possessing full knowledge of the global topology map of the network. A CCo is later chosen on the basis of topology map information.

In centralized network organization, a different assumption is made, namely, that there is, initially, an operative CCo. If such organization takes place on first initialization, or assembly, of a network, the first node to join that network assumes the start-up role of CCo, collects topology-discovery information communicated during discovery from each of the individual nodes, and alone builds a resulting global topology map. Later, a different CCo node may be chosen if a different node seems to offer better "characteristics" to function as CCo.

Figure 2:
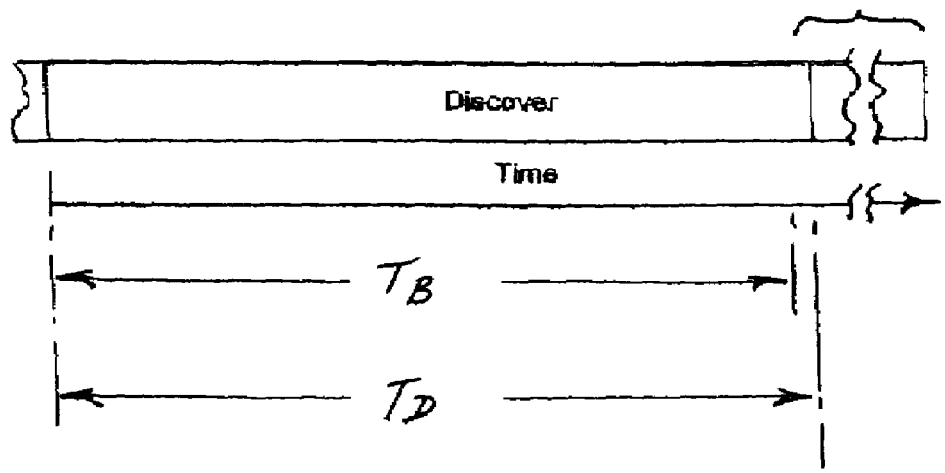
FIG. 2 presents a time-based diagram which pictures the topology discovery practice of the invention with reference to two, different, relevant time intervals $T_D$ and $T_B$. $T_D$ is the time interval allowed for performance of the invented topology discovery method, and $T_B$, the shorter time interval, represents a defined network beacon interval.

With respect to whatever event, or defined condition, such as those set forth above, exists, the topology discovery practice of the invention is implemented for a network, or for a proposed network, as illustrated in FIG. 3. Start-up (block 46) is initiated appropriately by all nodes in a distributed network situations, and by a "current CCo" in a centralized network situation. Looking for a moment at FIG. 2, at the beginning of the topology discovery process, a time interval for such discovery is appropriately set. This is done either by all nodes collectively (distributed situation), or by a "current CCo" (centralized situation). Any suitable, conventional practice may be employed in the setting of the length of this discovery time interval. What is important in the practice of the present invention is that the established time interval for discovery, $T_D$ in FIG. 2, be longer than the existing, or intended, established network beacon interval, $T_B$ in FIG. 2. This is done to assure ample unimpeded time for all relevant topology-discovery information to be gathered.

Additionally, any suitable, conventional, non-contention communication protocol may be employed to create a condition, during interval $T_D$, wherein all participating nodes are "asked/allowed" in a non-conflicting way each to transmit a discovery message which will effectively be heard by all of the other participating nodes.

When the topology discovery practice begins, to the extent, if at all, that some or all of the participating nodes possess "knowledge" of previously determined network topology, these nodes effectively "clear" this prior knowledge in readiness for the creation of new topology information.

All nodes in the "organizing network" during the discovery time interval transmit, contention-free, their respective "capabilities, characteristics and communication link situations" which are then heard and captured by all other nodes. The architecture of a typical discovery message transmitted by each node is pictured in FIG. 4. It is thus, during this special time interval, and from the information-transmission which then takes place, that all nodes, effectively in a single step, learn fully about each other's presence, capabilities, characteristics, state of connectivity, etc. It is in this practice, as will be seen, that the desired network topology becomes revealed for overall mapping, and the network nodes (all nodes) become aware of the topology nature of the organizing network. It is also in this practice that hidden nodes and proxy nodes are discovered.

At the end of the discovery process per se, each node possesses what is referred to as a discovered nodes list which has been created during discovery transmissions. This list (block 48 in FIG. 3) takes the form of a data structure that contains all of the acquired topology discovery information. For each node, then, the discovered nodes lists are organized into a network topology table for possession by that node.

An illustration of discovered nodes lists and related, node-specific topology tables (for nodes A and D) is provided in FIG. 5. Describing what is shown in this figure with respect, for example, to node A, the topology table for this node consists of its own discovered nodes list (A, B, C) in the first column. Since node A in the illustration now being given is also a "current" CCo, this node maintains the discovered nodes lists of hidden nodes (D, E) as well. The rows in FIG. 5 correspond to the discovered node lists received from each of the participating nodes. For example, the discovered nodes list of node A is (A, B, C). That of node C is (A, B, C, D, E). That of node E is (C, D, E), and so on.

The table of FIG. 5 has been constructed further to illustrate that it may be possible that node B can hear node C, but that node C might not be able to hear node B. This implies that the link between nodes B and C is not operational in both directions (i.e., is non-bi-directional) and hence is not a valid link. This condition is illustrated by (X) in the discovered nodes list from node B in node A's topology table. Node B does show up in node C's list.

Once the topology tables for all of the participating nodes has emerged from the discovery process described, an appropriate overall network topology map (block 54 in FIG. 3) is created. This is done either by operations performed by all of the participating nodes (block 50 in FIG. 3) in the setting of a distributed network, or by the operation of a selected CCo (block 52 in FIG. 3) in the setting of a centralized network.

Following the creation (block 54) of a network topology map, this map is made appropriately available (block 56) for further network organization. In a distributed network situation, all nodes can perform the task of creating the overall topology map because of the full topology information which each node possesses. In a centralized network situation, the operating CCo gathers all node-acquired topology information to create the overall map.

From the thus innovatively created overall topology map, candidates for being hidden nodes, and proxy nodes are fully revealed. The information needed to create this map is uniquely gathered effectively in a single discovery protocol step, or stage, of operation during the created topology-discovery time interval. This time interval is dedicated for use whenever any one of a number of predetermined conditions, or events, indicates the need to develop an accurate picture of network topology for appropriate network organization, or re-organization. As one can see, the proposed topology discovery process of the present invention, and the resulting overall topology map, greatly facilitate ad hoc network self-organization.

It is appreciated that while a specific manner of practicing the invention has been illustrated and described herein, variations and modifications may be made without departing from the spirit of the invention.

I claim:

1. A dynamic method for performing ad hoc network topology discovery as an ongoing practice with regard to a collection of plural nodes, including topology discovery involving hidden nodes, said method comprising defining an appropriate topology-discovery condition which may be associated with all categories of such plural nodes, on the occurrence of the existence of such a condition, establishing and activating a discovery-communication protocol which is dedicated to allowing each of the plural nodes, including hidden nodes, specific transmission opportunities to broadcast, for topology discovery purposes, and for reception by all of the other nodes, its attributes, including its identity, its operating characteristics, its capabilities, and its associated link qualities in relation to the other nodes, whereby ultimately every one of the plural nodes becomes aware of these attributes of all of the other nodes, utilizing the results of said establishing and activating steps, creating an overall network topology map associated with all of the plural nodes and identifying a central coordinator node for the network based on the network topology map, then making the created network topology map available for use in activities involving subsequent organization of the nodes into a network, including the practices of creating suitable communication links between topology-mapped nodes, and enabling organization of a network into appropriate subnets and proxy networks including topology-mapped hidden nodes, and after a topology-discovery time interval $T_D$ sufficiently long to complete said steps of establishing and activating a discovery-communication protocol and creating an overall network topology map, repeating said steps of establishing and activating a discovery-communication protocol and, in response to any changes in the ad hoc network, creating a new network topology map including, when the attributes of the network so indicate, identifying a new central coordinator node.

2. The method of claim 1, wherein said making available is done in such a fashion that the created topology map is employable selectively for both distributed and centralized network-organizational approaches to network organization.

3. The method of claim 1, wherein, with respect to subsequent organization of the nodes into a network, there will be associated with the collection of plural nodes a controller beacon time interval having a defined length of time, and the mentioned established and activated discovery-communication time interval $T_D$ is set to be longer than that defined time length.

4. The method of claim 1, wherein prior to the time of said creating, there already exists a current central coordinator node, and said creating is performed by that node.

5. The method of claim 1, wherein prior to the time of said creating, there does not exist a current central coordinator node, and said creating is performed collectively by the collection of nodes.

6. The method of claim 1, wherein the mentioned discovery protocol involves the broadcast of a "discover beacon" by at least one node, which beacon echoes frame-schedule information contained within a master beacon transmitted by a network controller, if such a controller should then exist, and if such a controller does not then exist, involves a time-frame schedule which is consistent with schedules broadcast by other nodes.

7. The method of claim 6, wherein the discover beacon indicates to listening nodes periods of time within a frame when they may transmit any topology-discovery-related messages required to join/associate with the network, thus to be discovered.

8. The method of claim 7, wherein said utilizing involves creating an overall network topology map which contains a connectivity graph for the collection of nodes, including hidden nodes, and all other information needed to perform network organization, as well as information enabling packet routing.

9. A dynamic method for performing ad hoc network topology discovery in a power line network as an ongoing practice with regard to a dynamically changing collection of nodes, said method comprising:

activating a discovery-communication protocol which is dedicated to allowing each of the nodes in the network specific transmission opportunities to broadcast, for topology discovery purposes, and for reception by all of the other nodes, its attributes, including its identity, its operating characteristics, its capabilities, and its associated link qualities in relation to the other nodes, whereby ultimately the protocol discovers the existence of nodes which have joined the network, and their attributes, and the attributes of all of the other nodes which remain, after any nodes have left the network, utilizing the results of said activating step, creating an overall network topology map associated with all of the nodes and identifying a central coordinator node for the network based on the network topology map, then, using the created network topology map and the central coordinator node, creating suitable communication links and enabling organization of the network into appropriate subnets and proxy networks, and after a topology-discovery time interval $T_D$ sufficiently long to complete said steps of activating said discovery-communication protocol and creating an overall network topology map, repeating said steps of activating said discovery-communication protocol and, in response to any changes in the ad hoc network, creating a new network topology map including, when the attributes of the network so indicate, identifying a new central coordinator node.

10. The method of claim 9, wherein a controller beacon is transmitted over the network at an established network beacon interval $T_B$, and said topology discovery time interval $T_D$ is longer than $T_B$.

* * * * *